United States Patent
Toub et al.

(10) Patent No.: US 11,922,151 B2
(45) Date of Patent: Mar. 5, 2024

(54) COMPILER-GENERATED ASYNCHRONOUS ENUMERABLE OBJECT

(71) Applicant: MICROSOFT TECHNOLOGY LICENSING, LLC., Redmond, WA (US)

(72) Inventors: Stephen Harris Toub, Winchester, MA (US); Mads Torgersen, Issaquah, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 374 days.

(21) Appl. No.: 16/816,521

(22) Filed: Mar. 12, 2020

(65) Prior Publication Data
US 2020/0210156 A1 Jul. 2, 2020

Related U.S. Application Data

(63) Continuation of application No. 15/908,747, filed on Feb. 28, 2018, now abandoned.

(51) Int. Cl.
*G06F 9/455* (2018.01)
*G06F 8/41* (2018.01)

(52) U.S. Cl.
CPC .......... *G06F 8/443* (2013.01); *G06F 8/41* (2013.01); *G06F 8/427* (2013.01); *G06F 8/4441* (2013.01); *G06F 8/458* (2013.01)

(58) Field of Classification Search
CPC .......... G06F 8/427; G06F 8/41; G06F 8/4441; G06F 8/4436
See application file for complete search history.

(56) References Cited

U.S. PATENT DOCUMENTS

| | | | | |
|---|---|---|---|---|
| 2010/0313184 | A1* | 12/2010 | Gustafsson | G06F 8/41 717/116 |
| 2011/0265070 | A1* | 10/2011 | Meijer | G06F 8/314 717/159 |
| 2019/0187965 | A1 | 6/2019 | Toub | |

OTHER PUBLICATIONS

"Final Office Action Issued in U.S. Appl. No. 15/908,747", dated Jul. 24, 2020, 16 Pages.
"Office Action Issued in European Patent Application No. 19709205.9", dated Apr. 7, 2022, 6 Pages.
"Office Action Issued in India Patent Application No. 202017033894", dated Jul. 4, 2022, 7 Pages.
"Office Action Issued in European Patent Application No. 19709205.9", dated Sep. 29, 2023, 8 Pages.

* cited by examiner

*Primary Examiner* — S. Sough
*Assistant Examiner* — Mohammad H Kabir

(57) ABSTRACT

A single asynchronous enumerable object is generated that contains the data and methods needed to iterate through an enumerable asynchronously. The asynchronous enumerable object contains the code for traversing the enumerable one step at a time and the operations needed to suspend an iteration to await completion of an asynchronous operation and to resume the iteration upon completion of the asynchronous operation. The allocation of a single object to perform all of these tasks reduces the memory consumption needed to execute an asynchronous enumeration.

20 Claims, 10 Drawing Sheets

COMPILER-GENERATED ASYNCHRONOUS ENUMERABLE OBJECT

CROSS-REFERENCE TO RELATED APPLICATIONS

The present application is a continuation of application Ser. No. 15/908,747 filed on Feb. 28, 2018, which is hereby incorporated by reference in its entirety.

BACKGROUND

The iterator design pattern presents a methodology for an object-oriented programming language to iterate over a collection or sequence of data without exposing the structure of the data. This pattern separates the structure of the data (i.e. collection, sequence, etc.) from the logic used to traverse the data which is beneficial in cases where the structure is unknown, such as when the data is retrieved over a network or manufactured on demand. In this manner, the developer (i.e, programmer, user, etc.) does not have to track the number of elements in the collection, the number of elements that have been traversed and the number of elements in the collection remaining during a traversal. Instead, the iterator design pattern uses an iterator object to access the elements of a collection. Different object-oriented programming languages implement the iterator design pattern with specific interfaces that define the methods for accessing and traversing the collection using the iterator object.

A program may include an iterator block containing one or more source code statements that iterate through a collection of data, such as an array, list, string, etc. The iterator block may include an await statement that suspends processing in an iteration until an asynchronous operation completes. The state of the iteration at this point is saved in order to resume its execution at a resumption point when the asynchronous operation completes. The state data at each iteration may be stored in a separate dynamically-allocated object on a heap which incurs a significant cost for the dynamic allocation and for a garbage collection process to reclaim the objects when the state data is no longer used by the program. This overhead can be considerable and as such, adversely impact the responsiveness and performance of the program.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A single asynchronous enumerable object is generated that contains the data and methods needed to iterate through an enumerable asynchronously. The asynchronous enumerable object contains the code for traversing the enumerable one step at a time and the operations needed to suspend an iteration to await completion of an asynchronous operation and to resume the iteration upon completion of the asynchronous operation. The allocation of a single object to perform all of these tasks reduces the memory consumption needed to execute an asynchronous enumeration.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
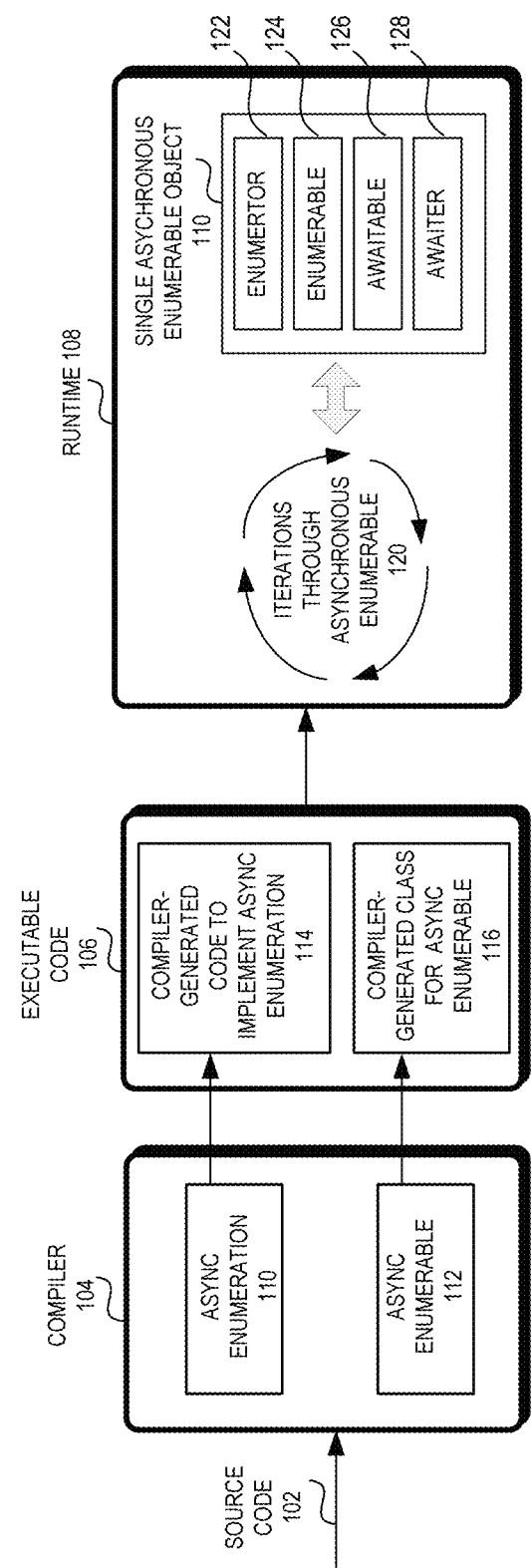
FIG. 1 illustrates an exemplary system that generates an asynchronous enumerable object for an asynchronous enumerable.

The subject matter disclosed pertains to techniques that reduce the amount of runtime support and memory consumption used to facilitate processing an asynchronous enumerable. An asynchronous enumerable is a collection or sequence of data that can be enumerated asynchronously. The enumeration of the asynchronous enumerable entails awaiting completion of zero or more asynchronous operation within an iteration. The techniques disclosed herein process the asynchronous enumerable using a single asynchronous enumerable object that contains the data, protocols, and operations needed to perform the asynchronous enumeration.

The subject matter disclosed is described with respect to an implementation of an asynchronous enumerable in the programming languages supported by the .NET framework (e.g., C#, F#, Visual Basic). The .NET framework is a code execution environment that supports object-oriented programming through a set of tools that enables the development and execution of software programs running in a Windows-based operating system. However, it should be understood that the subject matter disclosed is not limited to this particular implementation and that the disclosed techniques are applicable to other implementations of asynchronous and/or parallel programming environments.

An enumerable is a collection or sequence of data, such as an array, string or list, that can be accessed iteratively. An enumerator is an object that facilitates the traversal of a collection one element at a time. The enumerator allows a user to process each element in an enumerable without knowing the number of elements in the enumerable and the structure of the enumerable. An enumerator also acts as a cursor that points to a current element of a collection or enumerable.

The following code segment represents the asynchronous enumerable CountAsync( ):

```
static IAsyncEnumerable<int> CountAsync(int items)
{
    for (int i = 0; i < items; i++)
    {
        await Task.Delay( i * 1000);
        yield return i:
    }
}
```

At each iteration, there is an await statement that suspends processing for a period of time defined by time delay, Task.Delay(i*1000), before returning the value of i through yield return i. Lines 14-22 of the above-cited pseudocode contains a loop that iterates each await and yield statement the number of times defined by the variable items. The await statement causes processing to be suspended until the delay has completed. The state of the iteration or enumeration is saved at the suspension point and the iteration resumes upon completion of the asynchronous operation defined in the await statement.

In order to suspend execution of the enumeration at the suspension point, the state of the iteration and the resumption point would need to be stored on a heap until completion of the operations associated with the await statement. This would result in an object being allocated dynamically at each enumeration of the loop thereby increasing the memory consumption incurred by the asynchronous enumeration. The techniques described herein reduce this overhead by utilizing a single asynchronous enumerable object that stores the data, protocols, and methods needed to facilitate the enumeration through an asynchronous enumerable.

In order to execute the await statement, the compiler generates the code needed to perform the operations that support the await statement which includes saving the state of the iteration at a suspension point, determining when the asynchronous operation has completed and resuming execution of the iteration at a resumption point. This is shown more particularly with respect to the following pseudocode segment.

The CountAsync( ) asynchronous enumerable is consumed by the following pseudocode:

```
foreach async(int i in CountAsync (items))
{
    Console.WriteLine(i);
}
```

In the pseudocode above, the foreach statement calls CountAsync( ) once. The CountAsync( ) method returns an enumerable that is enumerated and the body of this loop calls Console. WriteLine( ) which is invoked a number of times defined by the variable items. The code that consumes the asynchronous enumerable is considered the asynchronous enumeration.

In order to suspend an iteration to await completion of an asynchronous operation, the techniques described herein use an awaitable and an awaiter. An awaitable is an object that contains the method GetAwaiter( ). The GetAwaiter( ) method sets up an awaiter to await completion of the asynchronous operation. The awaiter provides notification when the await expression has completed. The awaiter contains methods that implement the OnCompleted method, the GetResult method and the IsCompleted property, all of which are used to check if the asynchronous operation has completed, to set the state machine to the resumption point when the asynchronous operation completes, and to obtain the result associated with completion of the asynchronous operation.

In C#, there are several interfaces that are used to facilitate the iteration or enumeration through a collection of data asynchronously. An interface contains only the method signatures, properties, events, and indexers. A class or a struct that implements the interface must implement the members of the interface. The compiler in C# generates the implementations for the interfaces which are contained in the asynchronous enumerable object.

In one aspect, there is an IAsyncEnumerable<T> interface that exposes the enumerable which is the collection that can be enumerated asynchronously and the protocol used to enumerate the asynchronous enumerable. The IAsyncEnumerable<T> interface contains a GetEnumerator method that obtains a specific enumerator or iteration of the enumerable which is used to traverse the enumerable.

The IAsyncEnumerator<T> interface facilitates the traversal through the collection by exposing a Current property and the MoveNextAsync method. The Current property indicates the element in the collection at the current enumerator. The MoveNextAsync method advances the enumerator to the next element in the collection. The first call to the MoveNextAsync method moves the enumerator to the first element in the collection. The MoveNextAsync method returns false when the MoveNextAsync method passes the end of the collection and the enumerator is positioned after the last element in the collection. The MoveNextAsync method returns true when there is another element in the collection. The MoveNextAsync method returns an awaitable that provides notification when the asynchronous operation completes.

The IAwaitable<T> interface exposes the GetAwaiter method. The GetAwaiter method creates an awaiter which is an instance of a type, IAwaiter<T>, that exposes the ICriticalNotifyCompletion interface, the IsCompleted property and a GetResult method. The ICriticalNotifyCompletion interface exposes the OnCompleted method that hooks up a continuation at the continuation or resumption point, the IsCompleted property returns a boolean value that indicates whether or not the asynchronous operation has completed processing, and the GetResult method obtains the result of the asynchronous operation.

A single asynchronous enumerable object implements the IAsyncEnumerable<T>, IAsyncEnumerator<T>, IAwaiter<T>, and IAwaitable<T> interfaces thereby playing the role of the enumerator, enumerable, awaitable, and awaiter. In this manner, there is a single allocation of this object for all iterations of an asynchronous enumerable.

Due to the complexity of the implementations needed to execute an asynchronous enumeration, the compiler transforms the source code representing the asynchronous enumerable into a class that contains the implementations of the interfaces, methods, state machine and local data needed to enumerate the asynchronous enumerable.

Attention now turns to a more detailed description of the techniques, methods, systems, and devices that facilitate an asynchronous enumerable through the use of an asynchronous enumerable object.

Compiler-Generated Asynchronous Enumerable Object

FIG. 1 illustrates a block diagram of an exemplary system 100 for facilitating the enumeration of an asynchronous enumerable through the use of an asynchronous enumerable object. The system 100 includes a source code program 102 that is input to a compiler 104. The compiler 104 transforms the source code program 102 into executable code 106. In this compilation, the compiler 104 transforms portions of the source code program 102 representing an asynchronous enumerable 112 into a compiler-generated class 114 for a particular asynchronous enumerable. The compiler 104 also transforms portion of the source code 102 representing the asynchronous enumerable 110 into source code that performs the needed operations to execute the enumeration 110.

When the compiler-generated code 106 is executed, the runtime 108 allocates a single asynchronous enumerable object 110 based on the compiler-generated class 116 to facilitate the asynchronous enumeration. For each iteration 120 of a particular asynchronous enumerable 118, the single asynchronous enumerable object 110 represents the enumerable 122, the enumerator 124, the awaitable 126, and the awaiter 128.

The executable code 106 can be managed code that is compiled to execute under a runtime 108 or native code that is compiled to execute on a specific processor. In the case of the .NET framework, a program is compiled into an intermediate representation in a platform-neutral language referred to as the Common Intermediate Language (CIL) and is provided to a Common Language Runtime (CLR) 108 that compiles the intermediate representation at runtime into processor-specific machine or executable code 106. In other managed environments or implementations, the intermediate representation is executed using an interpreter or with a combination of the interpreter and the runtime environment.

In one aspect, the compiler 104 is a language compiler. A language compiler operates on the source code of a program written in a particular programming language. The language compiler parses the source code in accordance with the grammar of the underlying programming language. The language compiler can generate the executable code, either native or managed code (i.e., intermediate representation, bytecodes, etc.).

Although the system 100 shown in FIG. 1 has a limited number of elements in a certain configuration, it should be appreciated that the system 100 can include more or less elements in alternate configurations. The embodiments are not limited in this manner. For example, the system 100 may include an Integrated Development Environment (IDE) (e.g., Microsoft's Visual Studio®, NetBeans, Eclipse, SharpDevelop, Lazarus, etc.) which provides a set of software development tools, such as compilers, source code editors, profilers, debuggers, linkers, binders, etc. that facilitate the generation of the executable code with asynchronous programming support.

Figure 2A:
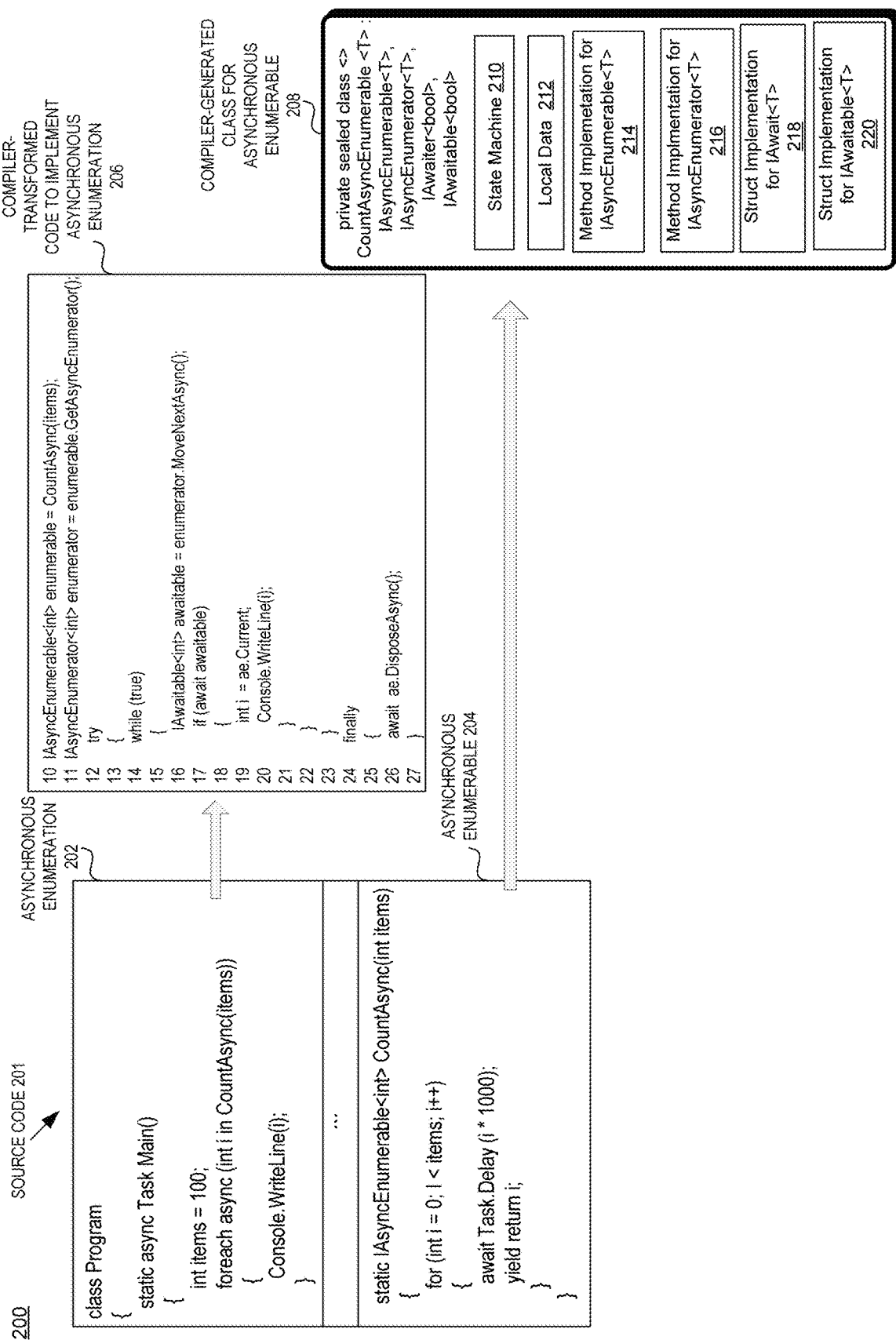
FIGS. 2A-2B illustrate the transformation of user source code defining an asynchronous enumerable into a compiler-generated class representing the asynchronous enumerable and the transformation of user source code defining an asynchronous enumeration into compiler-generated code that implements the asynchronous enumeration.
Figure 2B:
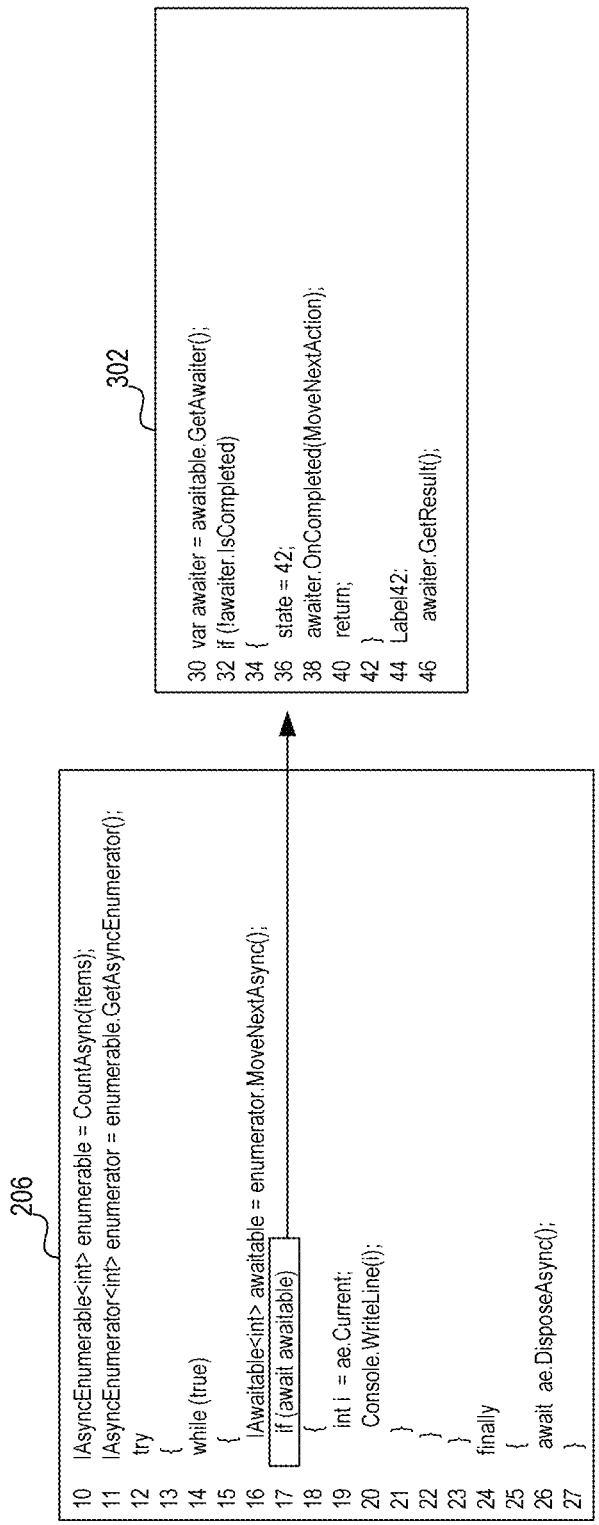

Attention now turns to FIGS. 2A-2B which illustrate the transformation process 200 of the compiler with exemplary pseudocode. It should be noted that the pseudocode enclosed herein is for illustration purposes and should not be construed as limiting the subject matter to a particular implementation. It should also be noted that when the transformed instructions are executed on a processor, these instructions implement a method that performs the actions of the transformed instructions.

The source code program 201 includes the asynchronous enumerable CountAsync( ) 204 that is consumed by the asynchronous enumeration 202. During compilation of the source code program 201, a compiler transforms the asynchronous enumeration 202 into the code shown in box 206. The code statement at line 10, IAsyncEnumerable<int> enumerable=CountAsync(items), identifies CountAsync( ) of type IAsyncEnumerable and sets the variable enumerable to the method CountAsync( ). The code statement at line 11, IAsyncEnumerator<int> enumerator=enumerable.GetEnumerator( ), invokes the GetEnumerator( ) method which returns the current iteration for the CountAsync( ) enumerable.

The while loop at lines 14-22 traverses through each element of the enumerable CountAsync( ). The MoveNextAsync( ) method moves the state machine to the next element in CountAsync( ) when the awaited operation has completed. The call to MoveNextAsync( ) returns an awaitable, which represents either true, false, or the asynchronous enumerable object. In line 17, if (await awaitable) yields true, then the asynchronous operation has completed and the process proceeds to lines 19-20 where Current returns the current value of i which is output through Console.WriteLine(i). If (await awaitable) yields false, then there are no more elements in the enumerable and the state machine proceeds to lines 24-27 which disposes of the task executing the asynchronous enumeration. If the call to MoveNextAsync( ) returns an awaitable that represents an operation which has not yet completed, the process awaits notification of completion of the asynchronous operation.

FIG. 2B illustrates the transformation of the if (await awaitable) statement (line 17 in pseudocode 206) into the transformed code 302. The statement in line 30, var awaiter=awaitable.GetAwaiter( ) calls the GetAwaiter method of the awaitable to create an awaiter. If the awaiter has not completed processing, if (!awaiter.IsCompleted), then the OnCompleted method is called in line 36 which sets up the continuation at the resumption point. If the awaiter has completed processing, then processing proceeds to line 44, Label42, where the GetResult method is called. The GetResult method obtains the result from the asynchronous operation.

Returning back to FIG. 2A, the compiler also generates a class to represent the asynchronous (async) enumerable 204. The compiler-generated class for the asynchronous enumerable 208 includes a state machine 210, local data 212 associated with an iteration, a method implementation for the IAsyncEnumerable<T> interface 214, a method implementation for the IAsyncEnuerator<T> interface 216, a struct implementation for the IAwait<T> interface 218, and a struct implementation for the IAwaitable<T> interface 220.

Attention now turns to a description of the various exemplary methods that utilize the system and device disclosed herein. Operations for the aspects may be further described with reference to various exemplary methods. It may be appreciated that the methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3:
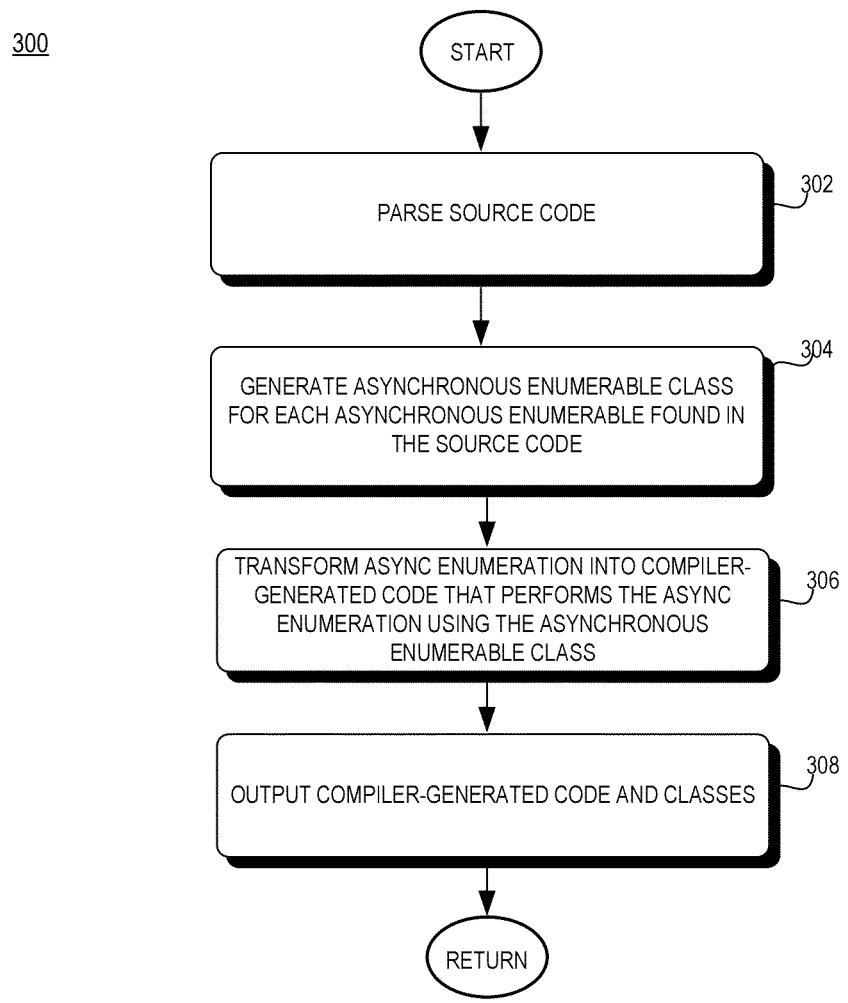
FIG. 3 is a flow diagram illustrating an exemplary method of a compiler for generating the asynchronous enumerable class and the code for implementing an asynchronous enumeration.

Turning to FIG. 3, there is shown an exemplary method 300 for transforming a user's source code into code that executes an asynchronous enumeration. A compiler parses the source code statements in a program (block 302). When the compiler recognizes an asynchronous enumerable, the compiler generates a class to represent the asynchronous enumerable and the methods needed to process the asynchronous enumerable (block 304). In one aspect, an asynchronous enumerable may be identified by a statement that defines a code segment having the type IAsyncEnumerable<T>.

During compilation of the source code program, when the compiler recognizes the asynchronous enumerable, the compiler generates a class for the enumerable (block 306). In one aspect shown in FIG. 2A, the class 208 contains a state machine 210, local data 212, and implementations for the IAsyncEnumerable<T> 214, IAsyncEnumerator<T> 216, IAwait<T> 218, and IAwaitable<T> 220 interfaces.

The state machine 210 is used to model the control flow of the asynchronous enumerable. The state machine structure 210 stores the code of the asynchronous enumerable, the state of the asynchronous enumerable which includes, at least, the local variables and parameters used to process the asynchronous enumerable and methods that facilitate transitions between the asynchronous enumerable and the asynchronous operation.

At the completion of the compilation, the compiler outputs the asynchronous enumerable class and the compiler-generated code into a format suitable as executable code (block 308).

The compiler may recognize a synchronous iterator in an iterator block having a yield keyword in it and its method returning an enumerable. The compiler may recognize an asynchronous iterator in an iterator block having a yield keyword and its method returning an asynchronous enumerable. The iterator block may contain an await keyword. The compiler transforms the user's source code containing an asynchronous enumeration into compiler-generated source code that performs the protocol for traversing the enumerable, suspending execution of an iteration at a suspension point, and resuming the execution at a resumption point.

Figure 4:
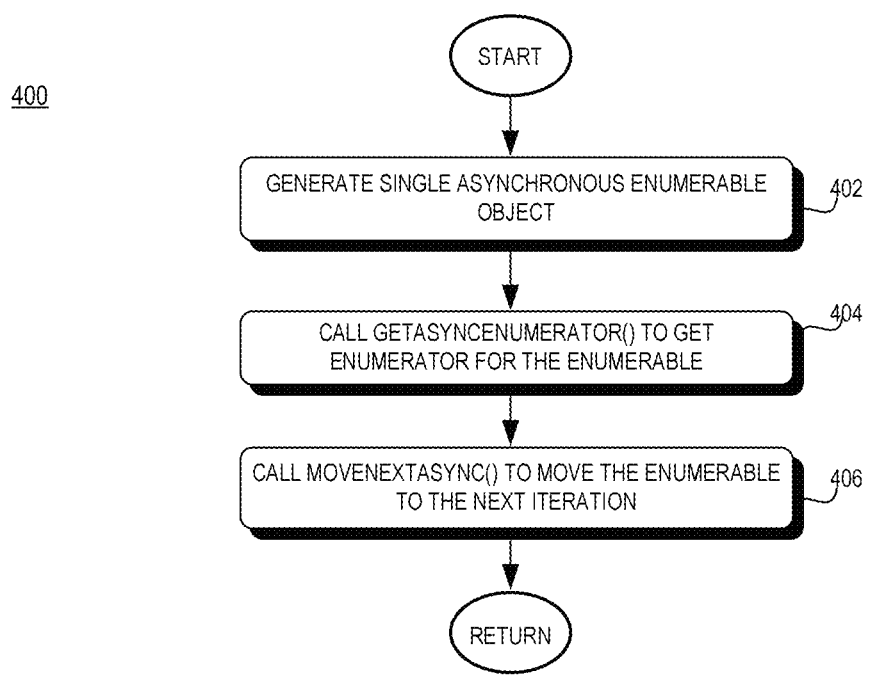
FIG. 4 is a flow diagram illustrating an exemplary method for executing an asynchronous enumeration.

Attention now turns to the runtime execution of the asynchronous enumeration. Turning to FIG. 4, when the executable code is run, the runtime creates the asynchronous enumerable object from an instantiation of the asynchronous enumerable class (block 402). The runtime creates the asynchronous enumerable object when a statement is encountered that defines an enumerable of type IAsynEnumerable, such as statement 10 in box 206 of FIG. 2—IAsynEnumerable<int> enumerable=CountAsync (items).

The asynchronous enumerable object contains the method GetAsyncEnumerator( ) that is called for a particular enumerable in order to obtain the enumerator for the enumerable (block 404). Once the enumerator is obtained, the process attempts to traverse through the enumerable by calling the MoveNextAsync( ) method on the enumeration (block 406).

Figure 5A:
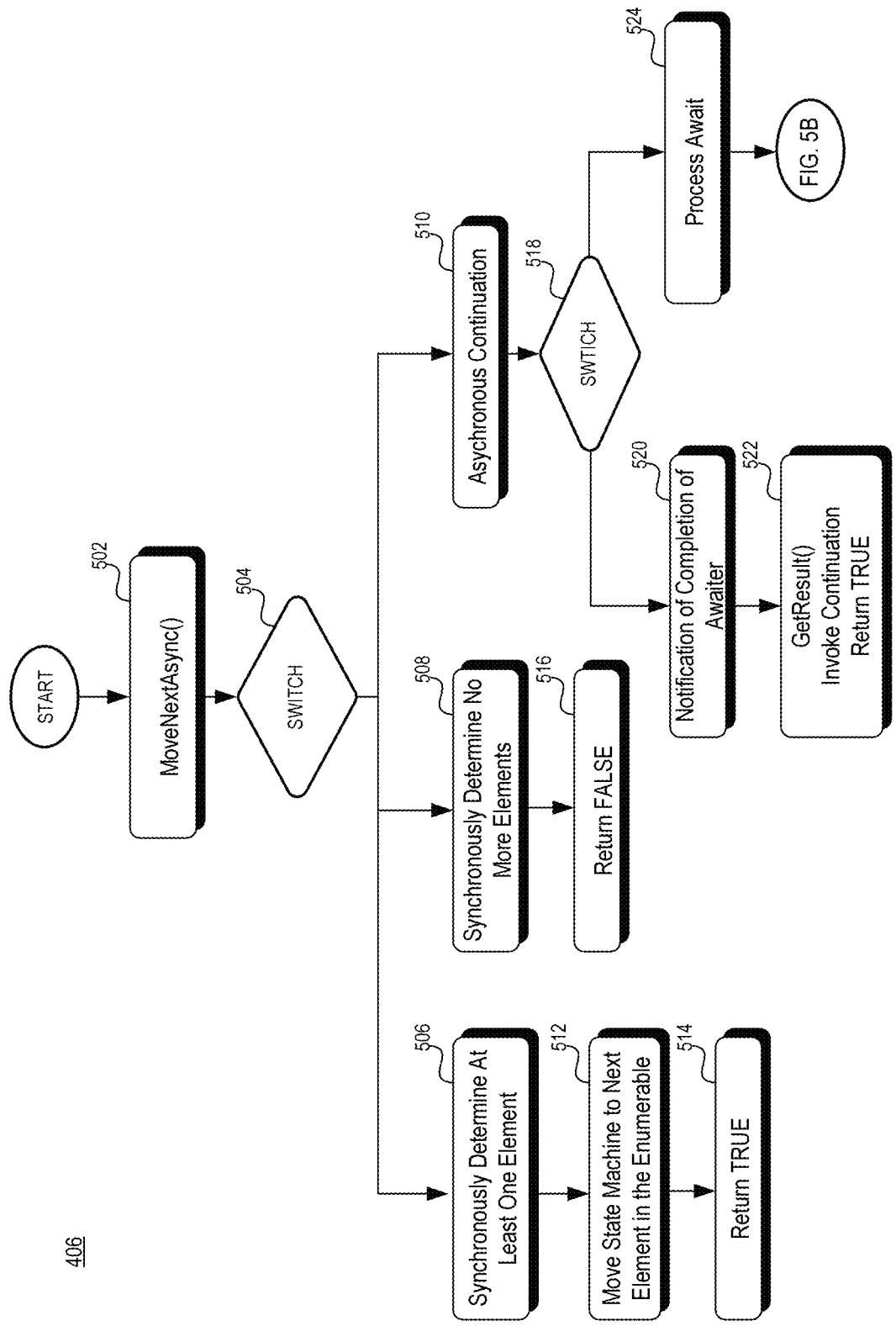
FIGS. 5A-5B illustrate an exemplary method for moving to a next state of an iteration asynchronously and synchronously.
Figure 5B:
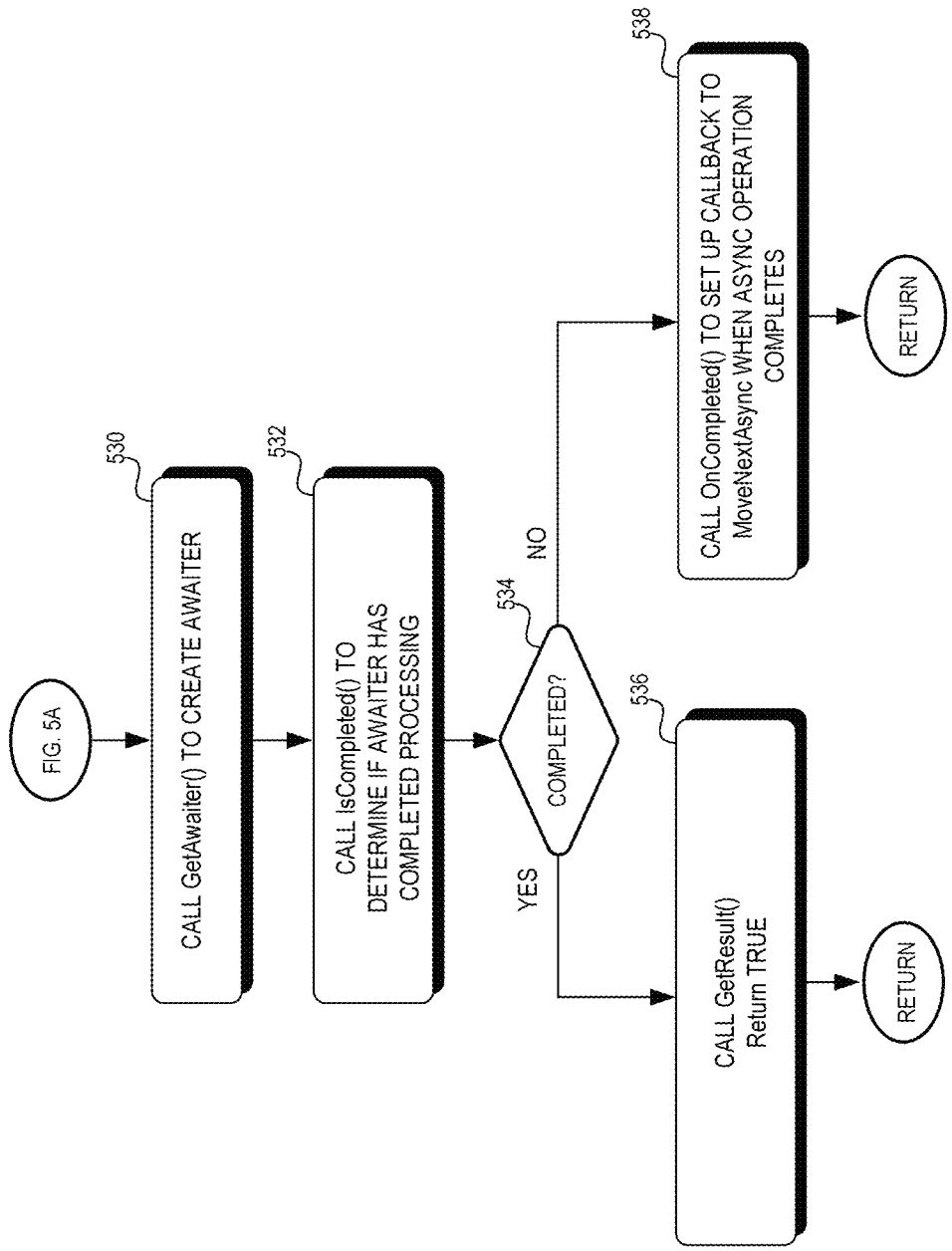

Turning to FIGS. 5A-5B, there is shown exemplary steps used in the MoveNextAsync method. When the MoveNextAsync method is called (step 502), the method performs one of several possible actions (switch block 504). The method may determine synchronously that there is at least one element in the asynchronous enumerable remaining (block 506), synchronously determine there are no more elements in the asynchronous remaining (block 508), or determine that an asynchronous continuation is warranted (block 510).

In the case where there is at least one element remaining in the asynchronous enumerable (block 506), the state machine is moved to execute an iteration of the asynchronous enumeration with the next element (block 512) and return the value true to the caller of the MoveNextAsync method (block 514). In the case where there are no more elements left (block 508), the MoveNextAsync method returns the value false to the caller of the MoveNextAsync method (block 516).

In the case where the process has to wait for the completion of an asynchronous operation (block 510), the method may proceed in one of two different directions (switch block 518). If the MoveNextAsync method is being notified of the completion of an awaiter (block 520), then the method calls GetResult (block 522) to obtain the result of the asynchronous operation (block 522). The method then proceeds to invoke the continuation at the resumption point and return the value true to the caller of the MoveNextAsync method (block 522).

In the case where the process is not being notified of the completion of an awaiter (block 524), the method calls the GetAwaiter method to create an awaiter for the operations of the await statement (block 530). The method calls the IsCompleted method to determine if the awaiter has completed processing (block 532). If the asynchronous operation has completed processing (block 534—yes), the method calls GetResult to obtain a result and returns to the caller of the MoveNextAsync method the value true (block 536). In the case where the asynchronous operations have not completed processing (block 534—no), the MoveNextAsync method calls the OnCompleted method to hookup the continuation to the resumption point which is a call back into the MoveNextAsync method (block 538).

Technical Effect

Aspects of the subject matter disclosed herein pertain to the technical problem of implementing an asynchronous enumeration with reduced memory consumption. The technical feature associated with addressing this problem is the consolidation of the data elements and operations needed to enumerate an asynchronous enumerable into a single asynchronous enumerable object. The asynchronous enumerable object is reused at each iteration of the asynchronous enumerable to perform the role of an enumerator, an enumerable, an awaiter and an awaitable. In this manner, the implementation of an asynchronous enumeration entails a single heap allocation for each iteration of an asynchronous enumerable.

Exemplary Operating Environments

Figure 6:
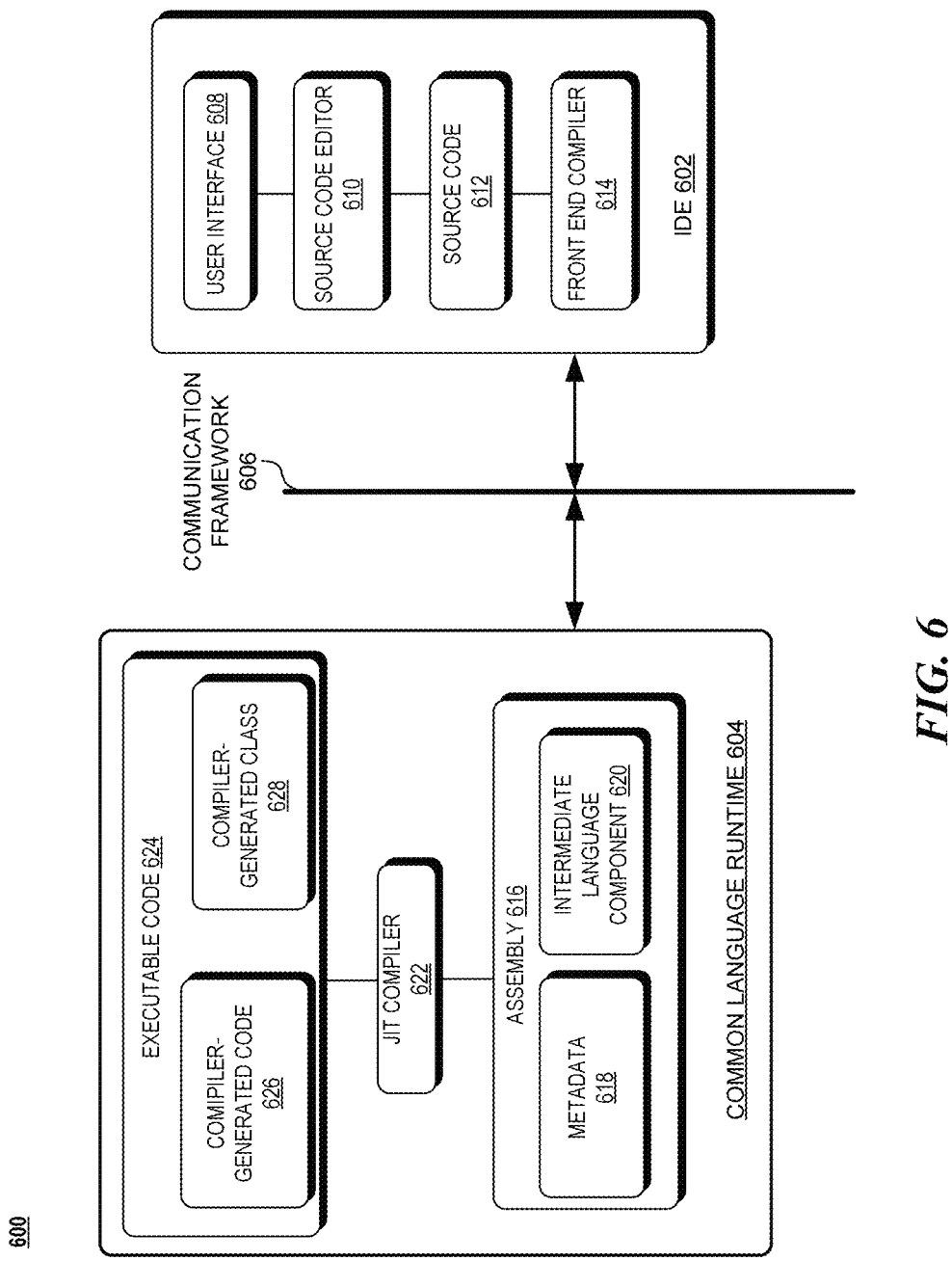
FIG. 6 is a block diagram illustrating a first operating environment.

Attention now turns to a discussion of exemplary operating environments. FIG. 6 illustrates an exemplary operating environment 600 that includes an integrated development environment (IDE) 602 and a Common Language Runtime Environment 604 communicatively coupled via a communication framework 606. The IDE 602 may allow a user (e.g., developer, programmer, designer, coder, etc.) to design, code, compile, test, run, edit, debug or build a program, set of programs, web sites, web applications, and web services in a computer system. Software programs can include source code 612, created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 602 may provide a native code development environment or may provide a managed code development that runs on a virtual machine or may provide a combination thereof. The IDE 602 may provide a managed code development environment using the .NET framework.

A user can create and/or edit the source code 612 according to known software programming techniques and the specific logical and syntactical rules associated with a particular source language via a user interface 608 and a source code editor 610 in the IDE 602. Thereafter, the source code 612 can be compiled via a front end or language compiler 614. During this compilation process, the front end compiler 614 generates instructions that provide runtime support for the execution of an asynchronous enumerable. The front end compiler 614 generates an intermediate language representation of the source code 612, such as assembly 616. The assembly 616 may comprise an intermediate language component 620 and metadata 618.

An intermediate language (IL) component 620 may be created from the source code component 612 and the front end compiler 614 and the executable code 624 (e.g., machine executable instructions) is created from the intermediate language component 620 using a just-in-time (JIT) compiler 624, when the application is executed. The executable code 624 includes the compiler-generated code 626 and the compiler-generated class 628 as described herein. When an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

Figure 7:
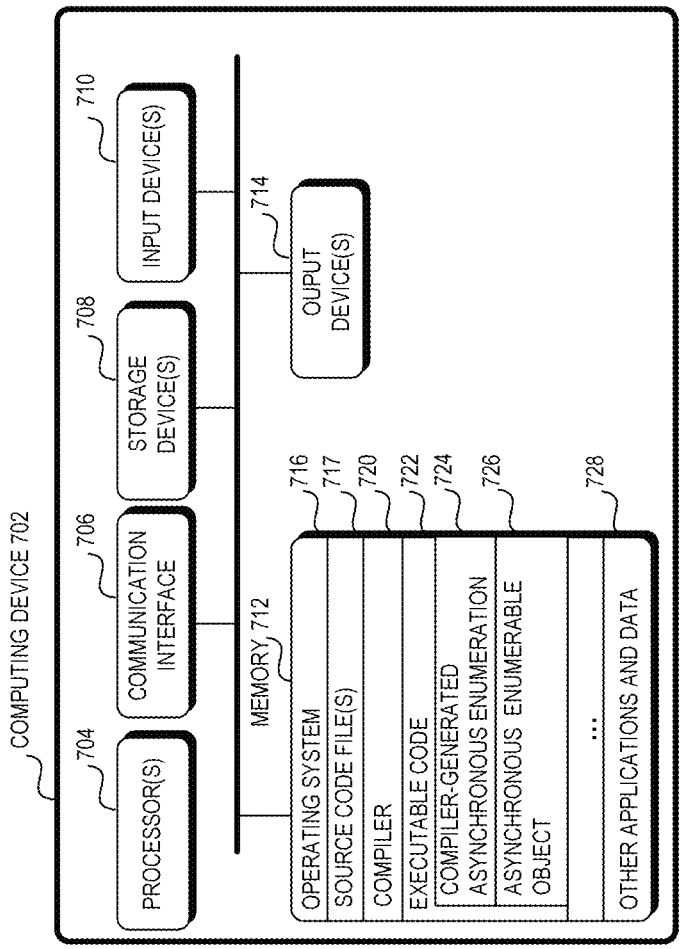
FIG. 7 is a block diagram illustrating a second operating environment.

Turning to FIG. 7, the aspects may be applied to a second operating environment 700 utilizing at least one computing device 702. The computing device 702 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 700 may be configured in a network environment, a distributed environment, a multi-processor environment, or a stand-alone computing device having access to remote or local storage devices.

The computing device 702 may include one or more processors 704, a communication interface 706, one or more storage devices 708, one or more input devices 710, one or more output devices 714, and a memory 712. A processor 704 may be any commercially available or customized processor and may include dual microprocessors and multi-processor architectures. The communication interface 706 facilitates wired or wireless communications between the computing device 702 and other devices. A storage device 708 may be computer-readable medium that does not contain propagating signals, such as modulated data signals transmitted through a carrier wave. Examples of a storage device 708 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 708 in the computing device 702. The input devices 710 may include a keyboard, mouse, pen, voice input device, touch input device, etc., and any combination thereof. The output devices 714 may include a display, speakers, printers, etc., and any combination thereof.

The memory 712 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagating signals, such as modulated data signals transmitted through a carrier wave. The memory 712 may also include one or more external storage devices or remotely located storage devices that do not pertain to propagated signals, such as modulated data signals transmitted through a carrier wave.

The memory 712 may contain instructions, components, and data. A component is a software program that performs a specific function and is otherwise known as a module, program, and/or application. The memory 712 may include an operating system 716, one or more source code files 718, a compiler 720, executable code 722 including a compiler-generated asynchronous enumeration 724 and an asynchronous enumerable object 726 and other applications and data 728.

Figure 8:
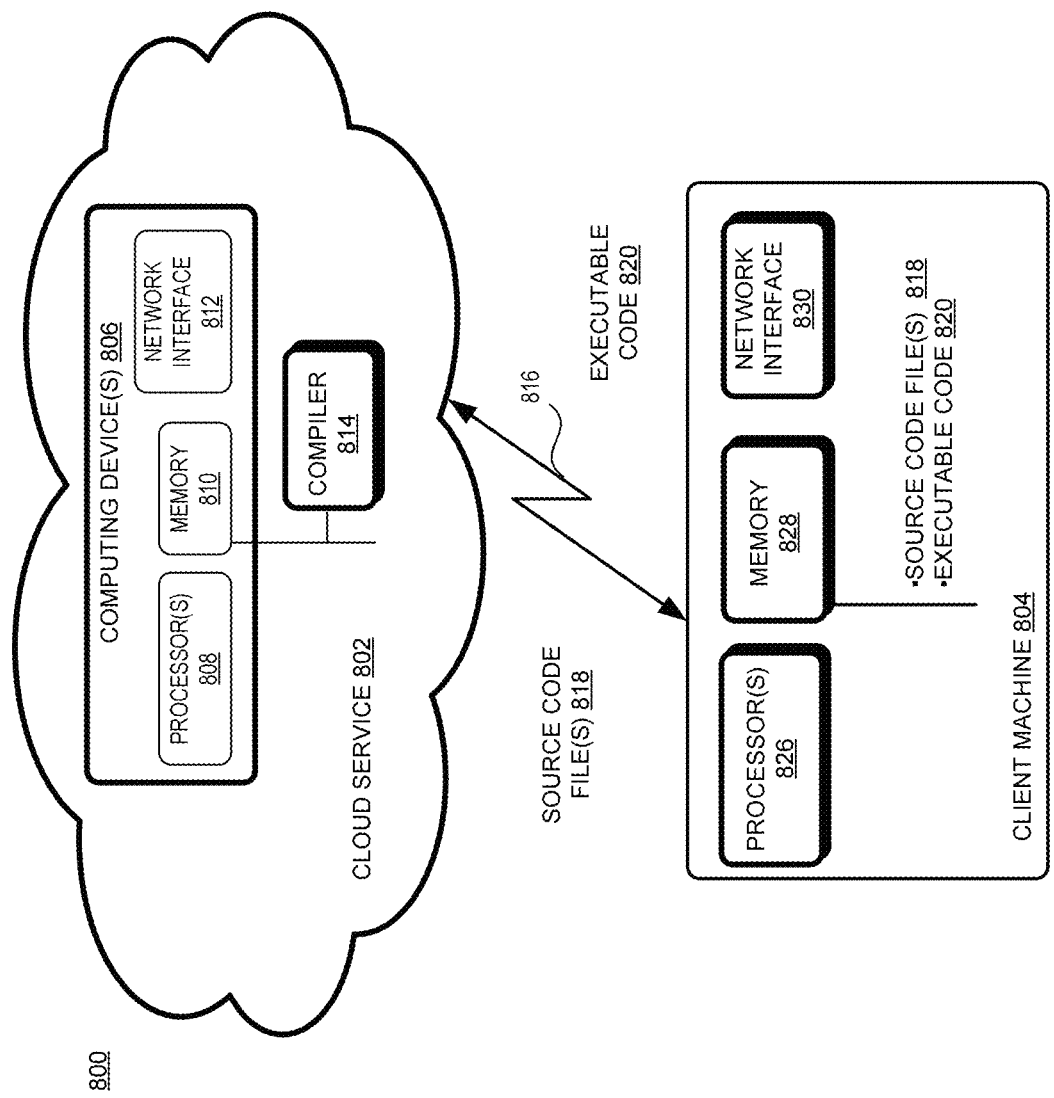
FIG. 8 is a block diagram illustrating a third operating environment.

FIG. 8 illustrates another operating environment 800 that utilizes a cloud service 802 to perform compilation services for users associated with one or more client machines 804. The cloud service 802 interacts with one or more client machines 804 through a network 816 to compile one or more source code files 818 into executable code 820 that includes the compiler-generated asynchronous enumeration and the compiler-generated asynchronous enumerable class. The cloud services may include one or more computing devices 806, where each computing device may include one or more processors 808, a memory 810 and a network interface 812. The memory may include a compiler 814 that receives the source code files 818 from a client machine 804 and which operates as described above to generate executable code 820. The client machine 804 may be any type of computing device that may include one or more processors 826, a memory 828, and a network interface 830. The memory of the client machine 828 may include the source code file 818 and the executable code 820 received from the cloud service 802.

A system is disclosed that has at least one processor coupled to a memory and a compiler. The compiler creates a class to execute an asynchronous enumeration, the class includes an asynchronous enumerable and the operations needed to perform an enumeration of the asynchronous enumerable, the operations include suspending execution of an iteration at a suspension point to await completion of an asynchronous operation and resuming execution of the iteration at a resumption point upon completion of the asynchronous operation, and the production of a first set of instructions that allocate an asynchronous enumerable object based on the class at runtime for the asynchronous enumerable and a second set of instructions that enumerate the asynchronous enumerable utilizing the single asynchronous enumerable object.

The class includes: a method that obtains an enumerator to traverse the asynchronous enumerable; a method that moves the enumerator to a next state of an iteration upon completion of the asynchronous operation; an awaitable that provides notification when the asynchronous operation completes; a method that determines if the asynchronous operation has completed processing, obtains a result associated with completion of the asynchronous operation and resumes processing at a resumption point upon completion of the asynchronous operation; a state machine that includes executable instructions of the asynchronous enumerable and local data associated with a suspended iteration; and a method that facilitates a continuation to a resumption point when the asynchronous operation completes. The class includes implementations for one or more of an asynchronous enumerator interface, an asynchronous enumerable interface, an awaitable interface, and an awaiter interface.

A device is disclosed that includes at least one processor and a memory. The at least one processor is configured to: receive a program including an asynchronous enumerable and an asynchronous enumeration, the asynchronous enumerable including an asynchronous operation, the asynchronous enumeration consuming the asynchronous enumerable; create a class for the asynchronous enumerable that contains operations to execute the asynchronous enumerable, the class including an implementation of an asynchronous enumerator interface, an implementation of an asynchronous enumerable interface, an implementation of an awaitable interface, and an implementation of an awaiter interface; transform the asynchronous enumeration into a set of instructions that execute the asynchronous enumeration using the operations of the class; and generate executable code that invokes a single object based on the class for all iterations of the asynchronous enumerable, the implementation of the awaitable interface provides notification when the asynchronous operation completes.

The implementation of the asynchronous enumerator interface provides methods that move the asynchronous enumerable to a next element, the implementation of the asynchronous enumerable interface includes a protocol to enumerate the asynchronous enumerable and an operation that obtains an enumerator that traverses the enumerable, the implementation of the awaiter interface includes an operation that hooks up a continuation at a resumption point, determines if the asynchronous operation has completed, and obtains the result of the asynchronous operation, and the implementation of the awaitable interface includes an operation that indicates whether or not there are additional elements in the asynchronous enumerable.

A method is disclosed that can implemented on a system or device disclosed herein that generates a reusable object for use in executing at least one iteration of an asynchronous enumerable, the asynchronous enumerable including an asynchronous operation, the reusable object including an enumerable, an enumerator, an awaitable, and an awaiter; executes the at least one iteration of the asynchronous enumerable; upon determining, through the awaitable, that the asynchronous operation has not completed, suspending processing of a current iteration until the awaiter signals completion of the asynchronous operation.

The method performs further actions that upon notification of the awaiter signaling completion of the asynchronous operation, resumes a state of a suspended iteration at a resumption point; synchronously determines that there is at least one element in the asynchronous enumerable that has not been processed and proceeds to iterate with the at least one element; synchronously determines that there are no more elements in the asynchronous enumerable and completes enumeration of the asynchronous enumerable; creates a class containing implementations to iterate the asynchronous enumerable at compile time, where the reusable object is based on the class; and transforms code that consumes the asynchronous enumerable into code to execute the at least one iteration using implementations of the enumerable, enumerator, awaitable, and awaiter in the reusable object.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system, comprising:
   at least one processor coupled to a memory; and
   a compiler that
      creates a class to execute an asynchronous enumeration, the class including an asynchronous enumerable and operations needed to iterate through the asynchronous enumerable, the operations including suspending execution of an iteration at a suspension point to await completion of an asynchronous operation and resuming execution of the iteration at a resumption point upon completion of the asynchronous operation, and
      produces a first set of instructions that allocate a single asynchronous enumerable object based on the class at runtime for the asynchronous enumerable and a second set of instructions that enumerate the asynchronous enumerable utilizing the single asynchronous enumerable object.

2. The system of claim 1, wherein the class includes a method that obtains an enumerator to traverse the asynchronous enumerable.

3. The system of claim 2, wherein the class includes a method that moves the enumerator to a next state of an iteration upon completion of the asynchronous operation.

4. The system of claim 1, wherein the class includes an awaitable that provides notification when the asynchronous operation completes.

5. The system of claim 1, wherein the class includes at least one method that determines if the asynchronous operation has completed processing, obtains a result associated with completion of the asynchronous operation and resumes processing at a resumption point upon completion of the asynchronous operation.

6. The system of claim 1, wherein the class includes a state machine that includes executable instructions of the asynchronous enumerable and local data associated with a suspended iteration.

7. The system of claim 1, wherein the class includes a method that facilitates a continuation to a resumption point when the asynchronous operation completes.

8. The system of claim 1, wherein the class includes implementations for one or more of an asynchronous enumerator interface, an asynchronous enumerable interface, an awaitable interface, and an awaiter interface.

9. A method implemented on a computing device having at least one processor and a memory, the method comprising:
   generating a single reusable object for use in executing a plurality of iterations of an asynchronous enumerable, the asynchronous enumerable iterates through a collection of data asynchronously, the single reusable object including an enumerable, an enumerator, an awaitable, and an awaiter, wherein the single reusable object is generated from instantiation of a compiler-generated class for the asynchronous enumerable;
   executing at least one iteration of the plurality of iterations of the asynchronous enumerable; and
   upon determining, through the awaitable, that an asynchronous operation of the asynchronous enumerable has not completed, suspending processing of a current iteration until the awaiter signals completion of the asynchronous operation.

10. The method of claim 9, further comprising:
   upon notification of the awaiter signaling completion of the asynchronous operation, resuming a state of a suspended iteration at a resumption point.

11. The method of claim 9, further comprising:
synchronously determining that there is at least one element in the asynchronous enumerable that has not been processed; and
proceeding to iterate with the at least one element.

12. The method of claim 9, further comprising:
synchronously determining that there are no more elements in the asynchronous enumerable; and
completing enumeration of the asynchronous enumerable.

13. The method of claim 9, wherein the compiler-generated class contains implementations to iterate the asynchronous enumerable at compile time.

14. The method of claim 9, further comprising:
transforming code that consumes the asynchronous enumerable into code to execute the plurality of iterations using implementations of the enumerable, enumerator, awaitable, and awaiter in the single reusable object.

15. A device, comprising:
at least one processor and a memory;
wherein the at least one processor is configured to:
receive a program including an asynchronous enumerable and an asynchronous enumeration, the asynchronous enumerable including an asynchronous operation, the asynchronous enumeration consuming the asynchronous enumerable;
create a class for the asynchronous enumerable that contains operations to execute the asynchronous enumerable, the class including an implementation of an asynchronous enumerator interface, an implementation of an asynchronous enumerable interface, an implementation of an awaitable interface, and an implementation of an awaiter interface;
transform the asynchronous enumeration into a set of instructions that execute the asynchronous enumeration using the operations of the class; and
generate executable code that when executed invokes, at runtime, a single object based on the class for all iterations of the asynchronous enumerable.

16. The device of claim 15, wherein the implementation of the awaitable interface provides notification when the asynchronous operation completes.

17. The device of claim 15, the implementation of the asynchronous enumerator interface provides methods that move the asynchronous enumerable to a next element.

18. The device of claim 15, wherein the implementation of the asynchronous enumerable interface includes a protocol to enumerate the asynchronous enumerable and an operation that obtains an enumerator that traverses the enumerable.

19. The device of claim 15, wherein the implementation of the awaiter interface includes an operation that hooks up a continuation at a resumption point, determines if the asynchronous operation has completed, and obtains the result of the asynchronous operation.

20. The device of claim 15, wherein the implementation of the awaitable interface includes an operation that indicates whether or not there are additional elements in the asynchronous enumerable.

* * * * *